United States Patent [19]

Ekman

[11] Patent Number: 4,564,042
[45] Date of Patent: Jan. 14, 1986

[54] PRESSURE-REDUCTION DEVICE FOR PRESSURIZED COUPLING MEMBERS

[76] Inventor: Kjell R. Ekman, Aberenrain 43, CH-6340 Baar, Switzerland

[21] Appl. No.: 650,152

[22] Filed: Sep. 13, 1984

[30] Foreign Application Priority Data

Sep. 22, 1983 [SE] Sweden .............................. 8305130

[51] Int. Cl.$^4$ .............................................. F16L 37/28
[52] U.S. Cl. .......................... 137/614.05; 137/614.03; 137/901
[58] Field of Search ................... 137/DIG. 2, 614.03, 137/614.02, 614.05

[56] References Cited

U.S. PATENT DOCUMENTS

| | | | |
|---|---|---|---|
| 568,238 | 9/1896 | Cary | 137/DIG. 2 |
| 1,146,850 | 7/1915 | Cullum | 137/DIG. 2 |
| 1,946,882 | 2/1934 | Russel | 137/DIG. 2 |
| 3,498,324 | 3/1967 | Breuning | 137/614.04 |
| 3,646,964 | 3/1972 | Stratmon | 137/614.03 |
| 3,670,770 | 6/1972 | Nelson | 137/614.04 |
| 3,910,312 | 10/1975 | Weinhold | 137/614.03 |
| 4,084,614 | 4/1978 | Ekman | 137/614.03 |
| 4,150,691 | 4/1979 | Maldans | 137/614.03 |
| 4,289,164 | 9/1981 | Ekman | 137/614.03 |

FOREIGN PATENT DOCUMENTS 663132 8/1929 France .
2068069 8/1981 United Kingdom .

*Primary Examiner*—A. Michael Chambers
*Attorney, Agent, or Firm*—Pollock, Vande Sande & Priddy

[57] ABSTRACT

A pressure-reduction device forms part of a quick coupling in the first and/or second part of said coupling. The part of the coupling concerned thus comprises a first valve member (4 or 5) equipped with a valve body being either fixed or capable of linear displacement by means of which a first passageway for the fluid is able to be opened and closed. The device includes a second valve member arranged in said valve body comprising a ball (17, 30) capable of being caused to bear against a seat (18) by means of a spring member arranged in a recess in the valve body. Said ball is raised against the effect of said spring member when the first and second parts of the coupling are connected together. In so doing the ball opens a second passageway for said fluid before actuation of the first passageway takes place, thereby creating a pressure-reduction effect in the part of the coupling concerned thanks to a small quantity of the fluid being diverted from the inside of the part of the coupling via the second passageway. The spring member (14, 33) acts upon the spherical member (17, 30) via a power transmission member (19, 20). The latter is guided by the wall (21a) of the recess and/or by the inside and/or outside (14a/14") of the spring member. The power transmission member is so arranged as to permit the flow of fluid to pass into the recess during the aforementioned process of being diverted.

14 Claims, 4 Drawing Figures

PRESSURE-REDUCTION DEVICE FOR PRESSURIZED COUPLING MEMBERS

The present invention relates to a pressure-reduction device in a quick coupling which includes first and second parts of the coupling. At least the first part of the coupling is equipped for this purpose with a valve body which is either fixed or capable of longitudinal displacement and which is provided with a first valve member, by means of which a first passageway for a fluid is capable of being opened and closed. The pressure-reduction device includes a second valve member arranged in said valve body comprising a ball or a sphere-shaped member caused to bear against a seat by means of a spring member arranged in a recess in the valve body. Said sphere-shaped member is raised against the effect of said spring member when the first part of the coupling is connected to the second part of the coupling and in so doing opens a second passageway for said fluid before activation or actuation of the first passageway takes place. In this way is created by means of the sphere-shaped member a pressure-reduction effect in the first part of the coupling, with a small quantity of the fluid being diverted in the presence of said pressure-reduction effect from the inside of the first part of the coupling via the second passageway.

Previously disclosed is the use of pressure-reduction devices in connection with quick couplings. It is desirable, however, for the quick coupling to be capable of operating over a long period and for a comparatively large number of connections and disconnections, which calls very much for said spring member and sphere-shaped member to be capable of being arranged in such a way that they will operate reliably and that they will not wear out or be affected in some other way preventing them from reliably performing their expected functions. In conjunction with this it is also desirable to be able to design the various component parts making up the coupling in such a way that it can be manufactured without imposing extreme demands in respect of accuracy and inspection. It is also desirable that the components should be designed in such a way that the economic conditions relating to their manufacture can be met.

It has been found that problems are associated with the ability to achieve long-term reliability of the function of said pressure-reduction device. The manufacture of the previously disclosed pressure-reduction device called for the accurate grinding of the ends of the utilized spring organ in such a way as to permit centered contact to be achieved with the sphere-shaped member or ball. In other cases the sphere-shaped members was found to exhibit a tendency after a certain period of use to adopt an inclined position in relation to its seat, resulting in reliable closing being unachievable with the sphere-shaped member.

The main object of the present invention is to create a device which will solve, amongst other things, the problem outlined in the foregoing. What may essentially be regarded as being characteristic of the novel device is thus that the spring member will influence the sphere-shaped member via a power transmission member which is guided against the wall of the recess and/or the insides and/or the outsides of the spring member, and that the power transmission member is so arranged as to permit the flow of fluid to pass in the recess during the aforementioned process of diverting said small quantity of fluid from the inside of the first part of the coupling via the second passageway.

The transmission power member should preferably be arranged for this purpose in such a way that the sphere-shaped member may be held by the force of the spring in a definite position on its seat. The spring member should preferably have the form of a helical spring which interacts with the power transmission member via one of its ends at one or a small member of points.

The power transmission member may be executed in various ways. Thus, in a first embodiment, the power transmission member will comprise a disc-shaped element which is designed in such a way as to be guided via its outer edge in the wall of the recess and/or with a central pin which extends inside said spring and is guided against the inside of the latter. In the case of a pin, this may have a length which is between 10 and 90%, and preferably between 40 and 75% of the length of the spring member when the latter is in its unactuated position.

In further developments of the conception of invention the second passageway leads via a housing for a member providing the reduction in pressure, being preferably in the form of a pressure pin, which is capable of interacting with the sphere-shaped member and extends to the outside of the valve body. The seat can also be arranged on a first nut-shaped organ which is capable of being screwed into the valve body. The recess should preferably comprise an axial bore in the valve body, and the recess leads from the inside of the first part of the coupling via a radial or oblique passageway. Said pressure pin should preferably be arranged in an axial recess in the first nut-shaped member and is located in same by means of a second nut-shaped organ which is capable of being screwed into the first nut-shaped organ and is capable of interacting with the pressure pin via a flange on the latter.

The spring member should preferably be supported at its end facing away from the sphere-shaped member on a first component part of said valve body which is capable of being connected to a second part of the valve body in such a way that the first and second parts when screwed together will form the valve body in question. The second component part will then support the pressure-reduction device in question.

At least one of the first and second connectable parts of the automatic coupling is provided with a pressure-reduction device. The invention thus also includes the case in which both parts of the automatic coupling are provided with pressure-reduction devices.

In one embodiment the second passageway can lead from the inside of the first part of the coupling to a channel which extends inside said pressure pin. The last-mentioned channel thus leads from the second passageway to the outside of the first part of the coupling.

In an alternative embodiment of the inner channel said pressure pin may be of prismatic form or of some other equivalent form such that the fluid in question can be led via the outside or outsides of the pressure pin and the walls of the recess which accommodates the pressure pin.

By means of the embodiment proposed above for a pressure-reduction device is obtained a pressure-reduction function which can operate for a long period with great reliability. This is achieved by the power transmission member exerting a definite influence on the sphere-shaped member in such a way that the latter is caused to be guided centrally onto its set, in so doing providing reliable closure of the second passageway when the first part of the coupling is disconnected from the second part of the coupling. There will thus be no tendency for leakage to occur during the disconnected phase.

DESCRIPTION OF THE DRAWINGS

A preferred embodiment of a device exhibiting the significant characteristics of the invention is described below with simultaneous reference to the accompanying drawings, in which:

FIG. 1 shows an automatic coupling of a previously disclosed kind. The automatic coupling is described in more detail in, amongst others, British Pat. No. 2 068 069 and will accordingly not be described in detail here. The coupling comprises a female component 1 and a male component 2 together with locking sleeves, locking balls and sealing members, etc., to which the common reference designation 3 has been allocated.

Figure 1:
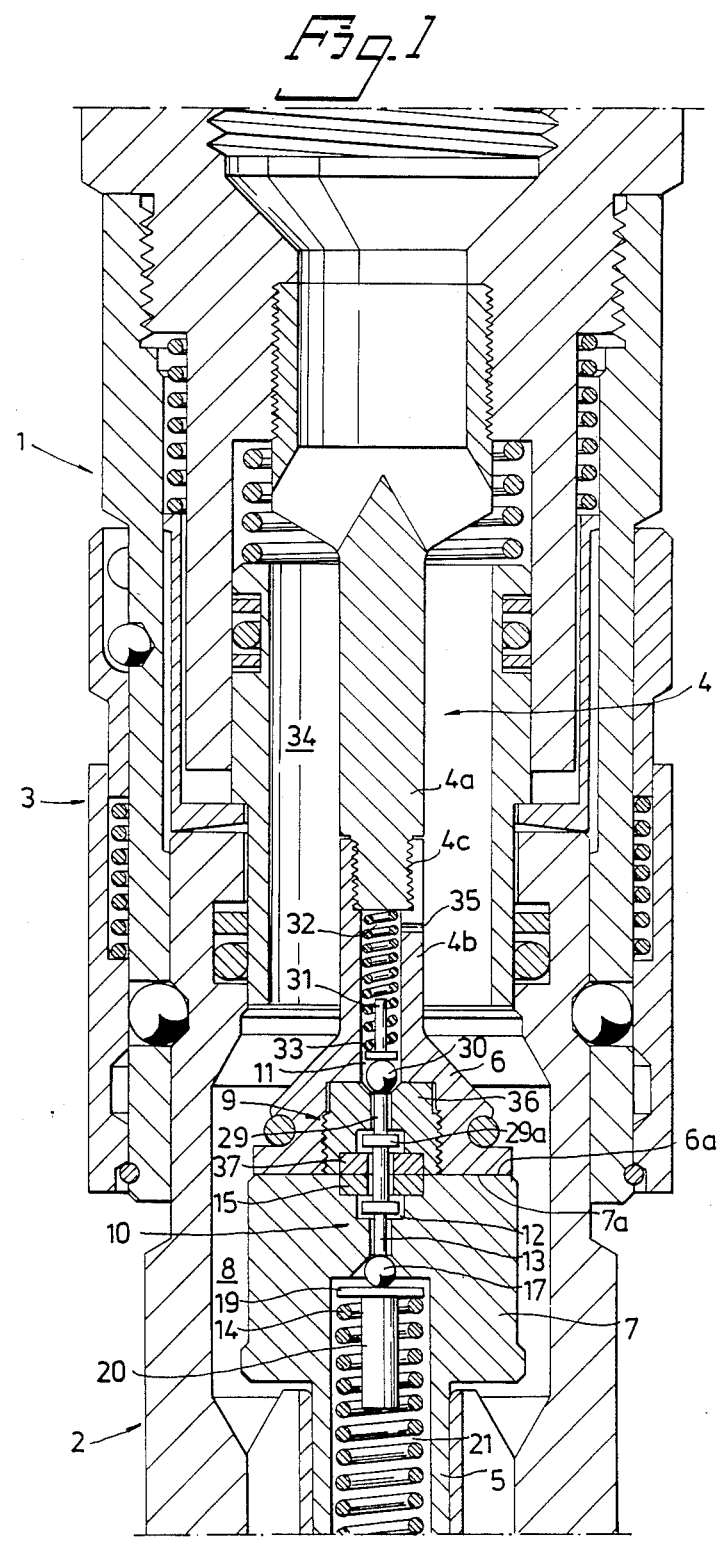
FIG. 1 shows in longitudinal section the pressure-reduction device inserted into a coupling of a previously disclosed kind, said coupling having been so modified as to be capable of utilizing the pressure-reduction device.

Of interest for the pressure-reduction device in accordance with the invention is the fact that the female component exhibits a valve body 4 which is fixed in its longitudinal sense, whereas the male component is provided with a valve body 5 which is capable of displacement in its longitudinal sense. When the male and female components are to be connected together the male component 2 is introduced into the female component 1. The valve body 7 in the male component is then displaced longitudinally in a rearward direction, as is at least one sleeve 3' in the female component, thereby forming a first passageway 8 for a fluid which is connected with the quick coupling in accordance with FIG. 1.

Connection shall be possible against a pressure existing inside one or both of the couplings. In the presence of at least high fluid pressure, however, connection would be rendered impossible or extremely difficult if the pressure-reduction device in accordance with the invention were not to be included in the coupling. In the present case both the female and the male components are provided with a pressure-reduction device, with the reference designation 9 being used to indicate the pressure-reduction device for the female component and the reference designation 10 to indicate the pressure-reduction device for the male component. The valve body 4 which is fixed in its longitudinal sense is constructed from two fitting components 4a and 4b which can be screwed together by means of the threads 4c. Each of the pressure-reducing devices will then function in such a way that, during the initial phase of connecting together the first and second parts 1, 2 of the coupling, second passageways 11 and 12 will be formed inside the valve body head 6 and the valve head 7 so that a small quantity of fluid will be allowed to pass in the present case through the second passageway in question from the inside of each coupling to the outside 6a and 7a of the heads. Only a small quantity of fluid need be diverted in order to achieve an effective reduction in the pressure inside each of the parts 1 or 2 of the coupling, which in turn will produce suitable conditions for the connection of the parts 1 and 2 of the coupling with small connection forces.

When disconnection of the first and second parts 1, 2 of the coupling takes place, the effect of the pressure-reduction devices in each part of the coupling will cease and a reliable seal will then be present in both the first and second passgeways with the parts of the coupling in their disconnected state.

Figure 2:
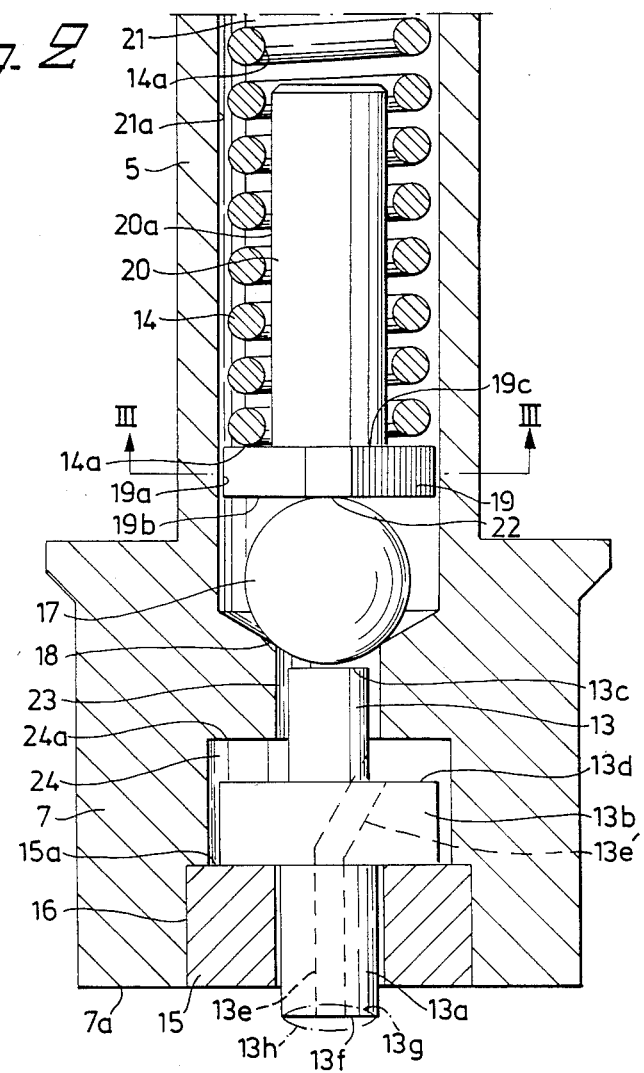
FIG. 2 shows on an enlarged scale in relation to FIG. 1 a longitudinal section of the structure of the pressure-reduction device.

FIG. 2 shows in detail the pressure-reduction device in the valve head 7 in accordance with FIG. 1. In FIG. 2 the pressure-reduction device is shown in its unactuated position. In this position a pressure pin 13 present in the pressure-reduction device 10 in accordance with FIG. 1 is so arranged that it is caused by a spring organ 14 to move to a first end position in which it projects by a component 13a beyond the end surface 7a of the valve head 7. Said spring organ 14 is utilized twice in the present case, since it normally also causes the valve body 5 to move in the direction of its associated seat in the male component. The end position in question for the pressure pin 13 is determined by a flange 13b on the pin. Said flange is able to interact when in said end position with a nut-shaped organ or a bushing 15 which is screwed into or pressed into a recess 16 in the valve head. The flange 13b then interacts with the bush 15 via an inner surface 15a of same.

The spring organ 14 also regulates via the movements of the valve 5 and the pressure pin 13 a ball valve consisting of a ball 17 capable of moving into contact with and making a seal against a seat 18.

The spring organ acts upon said ball 17 which in turn is able to interact with the pressure pin via an inner end surface 13c on the latter. The spring organ acts upon the ball via a power transmission organ 19, 20, of which 19 in the present case consists of a disc-shaped element and 20 constitutes a pin which extends inside the spring organ, which in the present case consists of a helical spring.

The spring organ 14, the power transmission organ 19, 20 and the ball 17 and the seat 18 are arranged in a central recess 21 in the valve 5. In the embodiment illustrated the element 19 is guided via a peripheral surface or corner 19a against the inner wall 21a of the recess 21. The element is so executed as to exhibit a flat lower surface 19b and single-point contact 22 exists between the element and the sphere-shaped organ 17. The pin 20 is also capable of being guided via its outer surface 20a against the inside 14a of the spring organ. Said recess 21 changes for the purpose of forming said seat 18 into a second recess 23 of smaller cross-section than the first recess 21. Said second recess changes into a third recess 24 which exhibits a greater cross-sectional diameter than the second recess. Parts of the pressure pin 13 extend into said second recess and up into interaction with the ball 17. Said flange 13b is arranged in the third recess. When the pressure pin 13 is forced inwards via its projecting part 13a as the first and second parts 1, 2 of the coupling are brought together in the automatic coupling, the ball will be forced from its seat 18 by the pressure pin 13. In its fully compressed position, which is determined by the surfaces 13d of the flange 13b and a boundary surface 24a in the third recess, the ball 17 will be caused to adopt its fully open position. A second passageway is formed in this way via the recess 21, the disc-shaped element 19, the ball 17 and the seat 18 and the second recess 23 and/or an inner channel 13e, 13e' in the pressure pin 13, and from the inner channel outwards to the outside of the valve head 7. A small quantity of fluid is thus able to flow out through the passageway described here in order to produce said reduction in pressure.

The disc-shaped element is executed specifically in order to permit the fluid to flow via the second passageway during the aforementioned process of being diverted.

Figure 3:
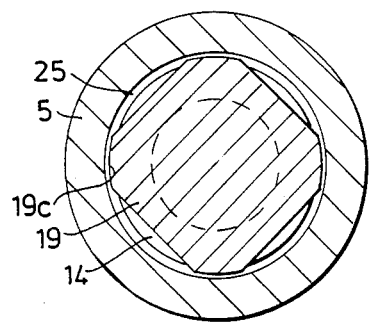
FIG. 3 shows a section through an organ forming part of the pressure-reduction device in accordance with FIG. 2.

FIG. 3 is intended to illustrate an example of how the disc-shaped element can be designed so as to permit said by-pass function to take place. In the present case the element is of square cross-section and is guided via its corners 19c against the inner wall 21a of the first recess 21. Open segments 25 of a circle are formed in this way between the element and said inner surface 21a. The size of the segments 25 can be varied by causing the lateral surfaces of the element to bend or by designing them so as to exhibit a curved form. The element may, of course, be of different designs and may, for example, exhibit a cross-section with a different number of corners, for instance triangular or pentagonal. The element 19 may also be executed with circular cross-section, in which case the element is provided with transcurrent holes extending between the upper and lower surfaces of the element. The length of the pin 20 may be varied and may, for example, be between 10 and 90%, and preferably between 40 and 75% of the length of the spring when this is in its unactuated position.

The pressure pin may also be designed so as to permit the passage of fluid via its outside or its outsides instead of via said central channel 13e, 13e'. The central channel exhibits an oblique section 13e' which extends into the transition between the flange and one of the ends of the pin. The pin may be provided with one or more such sections 13e'.

The use of the structure illustrated here means that the seating of the ball 17 on the seat 18 is not dependent upon the end 14a of the spring 14 being ground, and that the reliable actuation of the ball will occur even if in principle single-point contact is present between said end 14a of the spring and the upper surface 19c of the flange.

Figure 4:
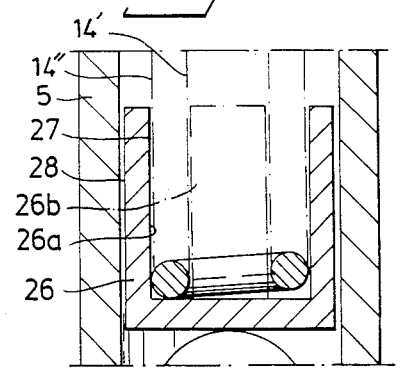
FIG. 4 shows an alternative embodiment of a power transmission member forming part of the pressure-reduction device.

An alternative embodiment of the power transmission member is shown in FIG. 4. In this case the power transmission member has the form of a piston 26 which is provided with an inner recess 27. The spring organ 14' extends downwards into this recess where it is guided along an inner wall 26a. Alternatively, the piston 26 may be provided with an inner central pin 26b so that an annular groove is formed for the spring, which will thus be guided on either side. The piston 26 can be given the same cross-section as the disc-shaped element 19; see FIG. 3. The piston in a preferred embodiment can incorporate a bottom part from which angular (corner) posts project upwards in the longitudinal sense of the recess or at right-angles to said bottom part. Alternatively, the piston 26 may be designed with circular cross-section, in which case the upright 28 is executed so that it is sufficiently large to permit fluid to flow during the aforementioned process of being diverted.

The pressure-reducing device for the female component or the head 6 of the fixed valve body 4 is similarly provided with a pressure pin 29 which is of the same shape as the pressure pin 13 and interacts with a ball 30 and a power transmission organ 31 in a similar fashion to that outlined above. Inserted in this case in a recess 21 corresponding to the recess 32 is a spring organ, the sole purpose of which is to actuate the ball valve in the pressure-reduction device of the head 6. The ball 30 interacts with a seat which corresponds to the seat 18 in FIG. 2. The recess 32 is in contact with an inner space 34 in the part 1 of the coupling via a passageway 35, which preferably consists of a radial or oblique hole. For the retention of the pressure pin 29 use is made in this case of a first nut-shaped organ or a first bushing 36 which is capable of being screwed or pressed into the head 6. This nut-shaped organ incorporates recesses which correspond to the second recess 23 and the third recess 24 in the embodiment in accordance with FIG. 2. In order to form said third recess use is also made of a second nut-shaped organ or a second bushing 37 which is capable of being screwed or pressed into a corresponding recess in the first nut-shaped organ or the first bushing 36. The second bushing corresponds to the bushing 15 in accordance with FIG. 2 and the pressure pin 29 has a flange 29a which corresponds to the flange 13b. The pressure pin 29 also has internal channels which correspond to the channels 13e, 13e' in the embodiment in accordance with FIG. 2. When the first part of the coupling adopts an unconnected position, the pressure-reduction device in the head 6 will thus not be actuated and the pin 29 will adopt a position which corresponds to the position shown in FIG. 2 for the pressure pin 13. When connection takes place and the surfaces 6a and 17a are pressed against each other the pressure pin 29 will be displaced longitudinally and the ball 30 will be raised from its seat. A passageway is formed in this way from the inner space 34, the passageway 35, the recess 32, the ball 30 and its associated seat and the second recess and said internal channel in the pressure pin which corresponds to the channels 13e and 13e'. A reduction in the pressure can thus take place in the first part of the coupling. The pressure pin 29 is also allocated two distinct positions by its associated flange 29a. Only a small quantity of fluid is diverted from the inside of the coupling in question to the contact surfaces between the heads 6 and 7. These contact surfaces 6a and 7a may, if necessary, be dished (bowled) so as to accommodate said small quantity of fluid from each coupling or from the coupling concerned.

In addition to the fact that contact will exist between the contact surfaces 6a and 7a in the event of the first and the second parts of the coupling being connected together, contact will also be made between the projecting end surfaces 13f of the pressure pins, which may thus exhibit a plane surface. Alternatively, the end surface of the one of the pressure pins may be executed in the form of concave end surface 13g and the end surface of the second pressure pin may be executed as a convex end surface 13h. The internal channels 13e, 13e' should preferably be selected within the range 0.3–3.0 mm. As a general rule the pressure pin will be provided with a passageway which is kept free from dirt and foreign bodies by the pressure of the fluid.

The use of the specific construction with first and second parts 4a and 4b for the valve body 4 results in an advantageous assembly in which the spring organ 3 can be provided with support from an end surface of the first part 4a.

The invention is not restricted to the embodiment illustrated above by way of example, but may undergo modifications within the concept of the following Patent Claims.

I claim:

1. A pressure-reduction device for a quick coupling having first and second parts, at least said first part being provided with said device and including a first valve member having a valve body by means of which a first passageway for a fluid is able to be opened and closed, said device comprising a spherical member arranged in said valve body so as to be capable of bearing against a seat in a closed position in response to a biasing effect of a spring member positioned in a first recess defined by a wall of said valve body, and a pressure pin held in a second recess in said valve body by means of a bushing capable of interacting with a flange on an intermediate portion of said pressure pin, one end of said pressure pin being capable of interacting with said spherical member and another end of said pressure pin being capable of interacting with said second part of the coupling; said spring member biasing said spherical member against said seat via a power transmission member which is guided by the wall of said first recess; said spherical member being arranged to be moved to an open position against the biasing effect of said spring member by said pressure pin as the first part of the coupling is connected to the second part of the coupling so as to open a second passageway for said fluid before said first passageway is opened by the valve body of said first valve member; and said opening of said second passageway causing a pressure-reduction effect in the first part of the coupling by diverting a small quantity of said fluid from the inside to the outside of the first part of the coupling via said second passageway.

2. A pressure-reduction device in accordance with claim 1, wherein the power transmission member includes means for engaging said spherical member and the wall of said first recess such that said spherical member is held in a definite position on its seat by the biasing force of the spring member.

3. A pressure-reduction device in accordance with claim 2 wherein the spring member has the form of a helical spring which interacts with the power transmission member via one of its ends at at least one point.

4. Pressure-reduction device in accordance with claim 2 wherein the power transmission member comprises a disc-shaped element which is so executed as to be guided via its outer edge in the wall of the recess and with a central pin which extends inside said spring and is guided against the inside of the latter.

5. Pressure-reduction device in accordance with claim 4, wherein the pin has a length which is between 40 and 75% of the length of the spring member when the latter is in its unactuated position.

6. A pressure-reduction device in accordance with claim 1, wherein the seat is on a first nut-shaped organ arranged in the valve body in such a way as to be capable of being screwed or pressed into place, the first recess comprises an axial bore in the valve body, the second recess leads from the inside of the first part of the coupling via a radially extending passageway, and the pressure pin extends to an external surface on the valve body and is held in said second recess by means of a second nut-shaped organ which is capable of being screwed or pressed into the first nut-shaped organ and is capable of interacting with the pressure pin via said flange on the latter.

7. A pressure-reduction device in accordance with claim 1, in which the spring member is supported at an end facing away from the spherical member on a first component part of said valve body, said first component part being capable of being screwed together with a second component part of the valve body, with the second component part supporting the pressure-reduction device.

8. A pressure-reduction device according to claim 1 in which said power transmission member has a shape providing a passage for said small quantity of fluid to flow past said power transmission member in said first recess during said fluid diversion.

9. A pressure-reduction device according to claim 8 in which the shape of said power transmission member is such that said small quantity of fluid flows between at least a portion of the perimeter of said member and the wall of said first recess.

10. A pressure-reduction device according to claim 1 in which said power transmission member has a first contact surface for contacting said spherical member and said first contact surface is shaped so that said power transmission member contacts said spherical member at a single point.

11. A pressure-reduction device according to claim 10 in which said pressure pin has a second contact surface for contacting said spherical member and said second contact surface is shaped so that said pressure pin contacts said spherical member at a single point.

12. A pressure-reduction device in accordance with claim 1 in which said second part includes a second valve member having a second valve body by means of which a third passageway for a fluid is able to be opened and closed, said second part being provided with a second pressure-reduction device comprising a second spherical member arranged in said second valve body so as to be capable of bearing against a second seat in a closed position in response to a biasing effect of a second spring member positioned in a third recess defined by a wall of said second valve body, and a second pressure pin held in a third recess in said valve body by means of a second bushing capable of interacting with a flange on an intermediate portion of said second pressure pin, one end of said second pressure pin being capable of interacting with said second spherical member and another end of said second pressure pin being capable of interacting with said first part of the coupling; said second spring member biasing said second spherical member against said second seat via a second power transmission member which is guided by the wall of said third recess; said second spherical member being arranged to be moved to an open position against the biasing effect of said second spring member by said second pressure pin as the first part of the coupling is connected to the second part of the coupling so as to open a fourth passageway for said fluid before said third passageway is opened by the second valve body of said second valve member; and said opening of said fourth passageway causing a pressure-reduction effect in the second part of the coupling by diverting a small quantity of said fluid from the inside to the outside of the second part of the coupling via said fourth passageway.

13. A pressure-reduction device in accordance with claim 12, wherein said second seat is on a first nut-shaped organ arranged in said second valve body in such a way as to be capable of being screwed or pressed into place, said third recess comprises an axial bore in said second valve body, said fourth recess leads from the inside of the second part of the coupling via a radially extending passageway, and the second pressure pin extends to an external surface on the second valve body and is held in said fourth recess by means of a second nut-shaped organ which is capable of being screwed or pressed into said first nut-shaped organ and is capable of interacting with the second pressure pin via said flange on the latter.

14. A pressure-reduction device in accordance with any of the preceding claims, in which the second passageway of the first part of the coupling includes a channel arranged inside the corresponding pressure pin which runs between the second recess and the outside of the first part of the coupling.

* * * * *